United States Patent
Seuberling

(10) Patent No.: US 9,267,516 B2
(45) Date of Patent: Feb. 23, 2016

(54) HYDROMECHANICAL CLAMPING DEVICE

(75) Inventor: Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 81 days.

(21) Appl. No.: 13/822,123

(22) PCT Filed: Aug. 16, 2011

(86) PCT No.: PCT/EP2011/064055
§ 371 (c)(1),
(2), (4) Date: Jun. 18, 2013

(87) PCT Pub. No.: WO2012/034801
PCT Pub. Date: Mar. 22, 2012

(65) Prior Publication Data
US 2013/0266368 A1    Oct. 10, 2013

(30) Foreign Application Priority Data

Sep. 15, 2010    (DE) .......................... 10 2010 040 784

(51) Int. Cl.
| | |
|---|---|
| *F16B 2/06* | (2006.01) |
| *B25B 5/06* | (2006.01) |
| *F16B 1/00* | (2006.01) |
| *F16B 31/04* | (2006.01) |
| *F16C 19/38* | (2006.01) |
| *F16C 35/063* | (2006.01) |

(Continued)

(52) U.S. Cl.
CPC . *F16B 2/06* (2013.01); *B25B 5/065* (2013.01); *F16B 1/005* (2013.01); *F16B 31/043* (2013.01); *F16C 19/38* (2013.01); *F16C 25/08* (2013.01); *F16C 35/063* (2013.01); *F16C 35/078* (2013.01); *F16C 2300/14* (2013.01); *Y10T 403/7062* (2015.01)

(58) Field of Classification Search
CPC .... F16C 25/083; F16C 35/063; F16C 35/078; F16C 2229/00; F16B 31/043; B25B 27/064; B25B 5/065
USPC .......... 403/5, 31, 40, 335–338, 373; 384/517, 384/556, 563
See application file for complete search history.

(56) References Cited

U.S. PATENT DOCUMENTS 2,972,504 A * 2/1961 Baker ............................. 384/99
3,462,180 A * 8/1969 Bunyan .......................... 403/40

(Continued)

FOREIGN PATENT DOCUMENTS

DE    CH 609598    * 3/1979
DE    2915088 A1    10/1980

(Continued)

*Primary Examiner* — Joshua Kennedy
(74) *Attorney, Agent, or Firm* — Bryan Peckjian; SKF USA Inc. Patent Dept.

(57) ABSTRACT

A clamping device includes a base body defining at least a portion of at least one pressure chamber, which has at least one opening oriented in a direction of action. A membrane is connected with the base body in a pressure-tight manner and seals the at least one opening in the direction of action. The membrane defines a first side wall section of the pressure chamber. A movable second side wall section partially delimits the pressure chamber and a constant amount of pressure fluid is sealed in the pressure chamber. At least one mechanical actuator displaces or deforms the second side wall section in order to cause the membrane to outwardly bulge.

23 Claims, 5 Drawing Sheets

(51) Int. Cl.
  *F16C 35/078* (2006.01)
  *F16C 25/08* (2006.01)

(56) References Cited

U.S. PATENT DOCUMENTS

| | | | |
|---|---|---|---|
| 3,463,044 A | * | 8/1969 | Hudgins et al. ............... 411/391 |
| 4,008,598 A | | 2/1977 | Purcupile et al. |
| 4,014,311 A | * | 3/1977 | Steere, Jr. .................. 125/13.02 |
| 4,150,912 A | * | 4/1979 | Gutsche et al. ................ 407/31 |
| 4,151,826 A | * | 5/1979 | Otte ........................... 125/13.02 |
| 5,125,776 A | * | 6/1992 | Muller et al. ................. 409/234 |
| 6,708,987 B1 | * | 3/2004 | Sperber ........................ 279/4.03 |
| 8,151,465 B2 | * | 4/2012 | Hewitt ....................... 29/898.07 |
| 8,318,069 B2 | * | 11/2012 | Liesegang et al. ............. 264/263 |

FOREIGN PATENT DOCUMENTS

| | | |
|---|---|---|
| DE | 102010048250 A1 * | 4/2012 |
| JP | 2008281084 A | 11/2008 |
| WO | WO 2011144736 A1 * | 11/2011 |

* cited by examiner

HYDROMECHANICAL CLAMPING DEVICE

CROSS-REFERENCE

This application is the U.S. National Stage of International Application No. PCT/EP2011/064055 filed on Aug. 16, 2011, which claims priority to German patent application no. 10 2010 040 784.4 filed on Sep. 15, 2010.

TECHNICAL FIELD

The invention relates to a clamping device which has a base body having a pressure chamber.

BACKGROUND ART

DE 29 15 088 AI describes a bearing element having a cylindrical part and having a ring-shaped part surrounding it, on which a hydraulic pressure medium continuously acts, wherein a pressure element abuts on the ring-shaped part, which has a hollow space to which the hydraulic pressure medium is applied. The pressure element is a steel ring whose hollow space has a rectangular cross section.

SUMMARY OF THE INVENTION

In one aspect of the present teachings, a clamping device includes a base body, which has at least one pressure chamber having at least one opening oriented in the direction of action, and a membrane sealing the at least one opening, which membrane is connected with the base body in a pressure-tight manner, wherein a constant amount of fluid is enclosed in the pressure chamber, the membrane forms a first side wall section of the pressure chamber and the clamping device includes a device for moving a second side wall section of the pressure chamber on the clamping device.

The clamping device can thereby serve to fix at least one machine element, in particular a rolling-element bearing or at least one of its two bearing rings on a shaft or in a bearing bore by axially pressing against a seat or against a further machine element, or additionally to secure a different type of fixing, such as for example a press-fit. The clamping device can also thereby serve to be inserted between two mutually-opposingly disposed machine elements, in particular rolling-element bearings, such as for example two rolling-element bearings to be used, in order to clamp these two components. Using the clamping device, a plurality of machine elements, in particular a plurality of rolling-element bearings or at least one of each of their bearing rings, can be fixed and/or secured on a shaft or a bearing bore.

The clamping device can function according to the basic principle of a pressurized-fluid power cylinder, wherein the inventive base body forms the housing having a pressure chamber, in which a pressure fluid is confined, and wherein the inventive membrane is equivalent to the piston, which carries out a movement due to the fluid pressure in the pressure chamber formed by the base body. Here "direction of action" means, in the sense of the invention, the particular direction in which the membrane can carry out a movement, in order to transmit a force to the machine element or rolling-element bearing or rolling-element bearing ring to be clamped. In a variant, the inventive membrane can be formed by an end side of a threaded section of one or more screws, which penetrate into the pressure chamber.

The membrane can be designed differently depending on the design of the base body. Any thin-walled component can be understood as a "membrane" in the sense of the invention, which component is pressure-tight with regard to the pressure fluid used, and has an elasticity which permits a movement of the membrane, despite a pressure-tight connection with the base body, which pressure-tight connection seals the inventive opening. This elasticity can be achieved through the choice of the wall thickness, through the design of sections of the membrane, through the material properties of the membrane, or through a combination of at least two of these characteristics. The membrane can be manufactured from the same material as the base body, and it can be fastened to the base body at its component edges in a pressure-tight manner, and the movement for transmitting the clamping force can be effected through an elastic bulging-out of a central zone of the membrane. The base body can be manufactured from steel, in particular it can be manufactured from another material, as it is used for example in known bearing rings of rolling-element bearings. The membrane can be manufactured from a metal plate.

According to the invention, by connecting a membrane in a pressure-tight manner with the base body having the pressure chamber, the function of the clamping device is improved. Thus, for example, the membrane can be manufactured from a different material than the base body. To achieve the required elastic properties, the membrane can have a lesser hardness than the base body. Alternatively, the membrane can have a greater hardness than the base body, and can be formed very thin to achieve the required elastic properties. Also, due to the use of at least one inventive membrane, only selected zones, instead of an entire surface, can also be formed in an elastically movable manner, in order to transmit a clamping force. In addition to the functional improvement, the base body can be manufactured more simply and thereby more cheaply, since no undercut hollow chambers must be manufactured, but rather the pressure chamber can be formed in the base body as open on one side, and this opening is subsequently closed by the inventive metallic membrane, in order to form a pressure-tight pressure chamber.

In the inventive clamping device, the pressure in the pressure chamber can be changed through individualized adjustment of the second side wall section of the pressure chamber. This is possible because a constant amount of fluid is enclosed in the pressure chamber.

By moving the second side wall section, and due to the constant amount of pressure fluid, the first side wall section or the membrane bulges outward. Using the bulging-out membrane, a machine element such as a rolling-element bearing can be mechanically clamped in a defined manner. The inventive clamping device can be controlled, i.e. its function monitored and optionally also adjusted. The clamping device can be repeatedly reused. The clamping device can be utilized universally, i.e. versatilely; in particular it can be used with different machine elements or rolling-element bearings without complex structural adaptations of the clamping device.

The device for moving the second side wall section can have a mechanical actuator. The mechanical actuator can either directly penetrate into the pressure chamber, or move the second side wall section, or indirectly act on the second side wall section of the pressure chamber. In one embodiment, in which the mechanical actuator acts directly on the pressure chamber, the mechanical actuator or a mechanical part of the actuator can penetrate into the pressure chamber. For this purpose the mechanical actuator can for example have a plunger or plunger section that penetrates into the pressure chamber.

In one embodiment, in which the mechanical actuator acts indirectly on the side wall of the pressure chamber, the mechanical actuator can move at least one side wall. Alternatively the mechanical actuator can deform at least one side wall. Consequently the mechanical actuator can be formed to move and/or deform a second side wall section of the pressure chamber.

Alternatively, the side wall or the second side wall section of the pressure chamber can be moved or deformed by a plunger or plunger section.

In one embodiment, the mechanical actuator can include a set screw for actuating the plunger section. For example, the plunger section can be formed from a threaded section of a set screw.

In all inventive embodiments, the second side wall section can be disposed, delimiting the pressure chamber, opposite of the membrane or opposite of the first side wall section. The second side wall section can in particular be disposed extending parallel to the membrane or the first side wall section.

In one embodiment, at least one set screw is axially-adjustably held using an externally-threaded section in an internally-threaded bore of the base body. The set screw can for example be actuated, i.e. turned, at a screw head. An end side of the screw opposite the screw head presses on a side wall section of the pressure chamber in the axial direction. This second side wall section can be flexed or bulged by the end side due to the advance of the screw. The membrane, i.e. the first side wall section of the clamping device, thereby bulges outward in turn. Both the membrane or the first side wall section and the second side wall section, which is actuated, i.e. deformed, by the screw, can be welded with the base body, in order to form a pressure-fluid-tight pressure chamber.

A constant amount of pressure fluid is enclosed in the pressure chamber of the inventive clamping device. In all inventive designs, the clamping device can be provided with a fill opening for filling an empty pressure chamber. The fill opening for pressure fluid can be disposed on a circumferential side of the base body. In all designs, the fill opening can be sealed by a stopper. Thus a constant amount of pressure fluid remains enclosed in the pressure chamber of the clamping device.

In all inventive designs the base body can be a metallic base body.

In all inventive designs the membrane or the first side wall section and/or the second side wall section can be connected with the base body in a pressure-tight manner, in particular welded or adhered.

The base body can be formed as a substantially ring-shaped body or as a ring, which is provided with a groove at least partially encircling the body for forming the at least one pressure chamber on its end surface oriented towards the direction of action; the groove is sealed by a substantially ring-disk-shaped membrane matched to the encircling extension of the groove. The thickness of the membrane and the depth of the groove can be dimensioned such that the outer side of the membrane terminates flush with the end side of the base body. In a groove for forming a receiving space for the membrane, a second groove can be provided in the groove base of a first groove, which second groove defines the size of the pressure chamber. This means that the groove can be designed in a stepped manner, so that it has a shoulder, on which the membrane sits in its installed position.

Alternatively, the base body can have a narrow groove on its end side oriented in the direction of action, which forms a closed section, which corresponds to the shape of the outer boundary of the membrane. An edge of the membrane extending opposite of the direction of action can engage in this groove.

In all inventive designs, the base body can be provided with a thread, in particular with an external thread disposed on the outer circumferential side of the base body, and/or with an internal thread disposed on the inner circumferential side of the base body, for forming a clamping nut. An inventive clamping device formed as a clamping nut can be used for the clamping of rolling-element bearings. Using a clamping nut having a thread, a single bearing ring of a rolling-element bearing, or a plurality of bearing rings of a plurality of rolling-element bearings can be clamped against a bearing seat or against a further rolling-element bearing.

The base body can be a metallic base body. Alternatively or additionally, the membrane or the first side wall section and/or the second side wall section can be a metallic membrane. The membrane or the first side wall section and/or the second side wall section can be manufactured as a composite component, in particular as a composite component having metallic components.

A membrane which is for example metallic or the first side wall section and/or the second side wall section can be connected with the base body in a pressure-tight manner, in particular welded or adhered. An edge side of the in particular metallic membrane or the first side wall section and/or the second side wall section can thereby abut on the base body. The in particular metallic membrane or the first side wall section and/or the second side wall section can form a butt joint or flat joint with the base body, which is welded, preferably flush, using a weld seam encircling the edge of the in particular metallic membrane or the first side wall section and/or the second side wall section, in particular a butt weld or a V-weld.

In particular the inventive clamping device or the inventive clamping nut can serve to clamp rolling-element bearings for the rotor support of wind turbines, in particular of the multi-megawatt class. Large rolling-element bearings of this type can be clamped based on a double row tapered roller bearing, for example an outer diameter of 2330 millimeters. These double row tapered roller bearings can also support tilting moments in addition to the usual radial and axial loads. It is thereby possible to support the rotor with only a single bearing.

In all inventive designs, a plurality of devices for moving the second side wall section of the pressure chamber, in particular a plurality of mechanical actuators, can be disposed in a distributed manner, in particular in an evenly distributed manner, around the circumference of the base body.

BRIEF DESCRIPTION OF THE DRAWINGS

An exemplary embodiment of the invention is illustrated in an exemplarily manner in the appended schematic drawings.

DETAILED DESCRIPTION OF THE INVENTION

Figure 1:
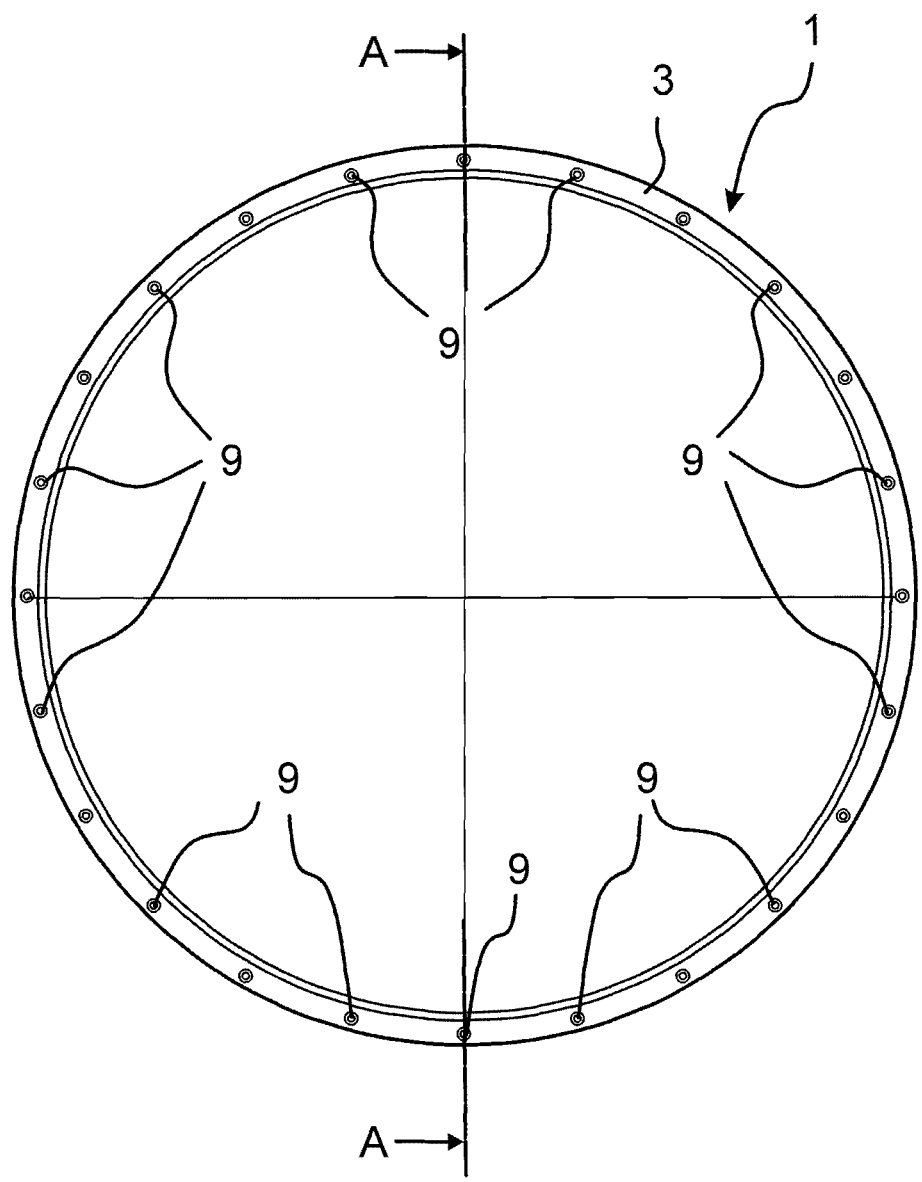
FIG. 1 shows a plan view of an inventive clamping device.

The clamping device illustrated in FIG. 1 has a circular-ring-shaped base body 3. A plurality, i.e. in the depicted exemplary embodiment twenty-four, mechanical actuators 9 are disposed in an evenly distributed manner on a circle on a rearward end side 5 of the base body 3; the rearward end side 5 is depicted so as to be visible in the forward direction in FIG. 1.

Figure 2:
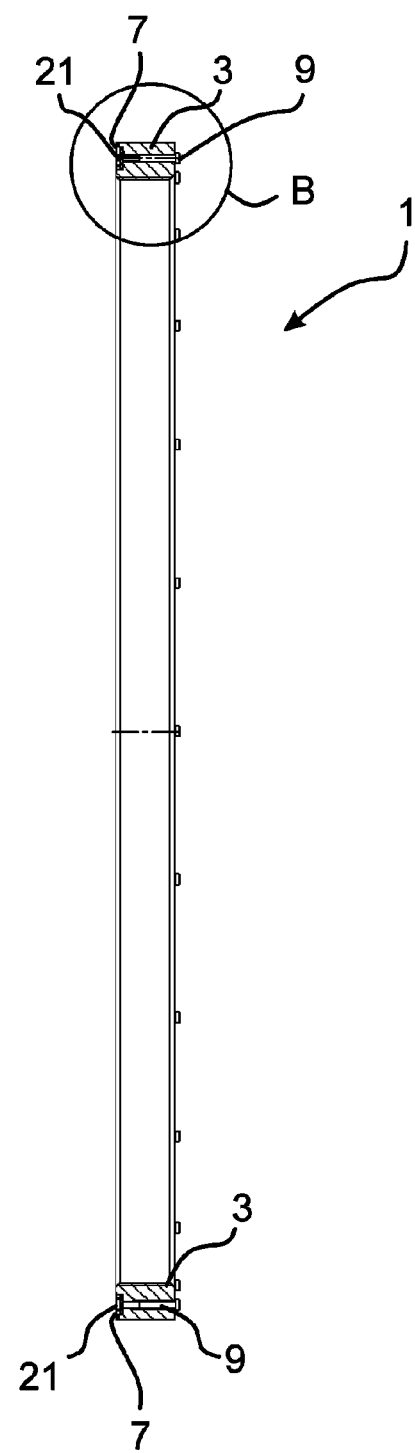
FIG. 2 shows a cross section along the intersecting line A-A through the inventive clamping device according to FIG. 1.

In FIG. 2 the clamping device 1 according to FIG. 1 is illustrated in a cross section along the intersecting line A-A. The clamping device 1 includes a membrane 21 on a front-side end surface 15 of the base body 3 opposite the rearward end side 5 of the base body 3.

Figure 3:
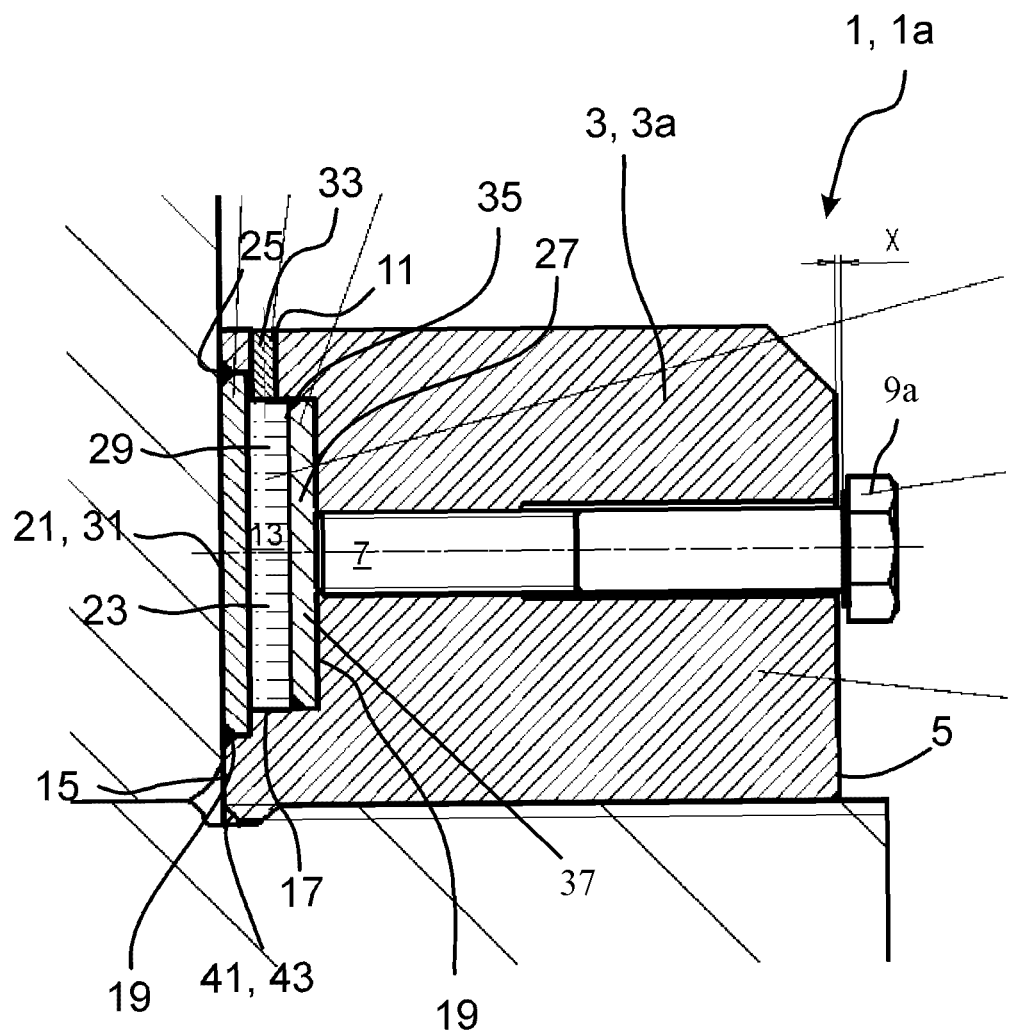
FIG. 3 shows an enlarged partial cross section B from the view according to FIG. 2, in an unclamped position.

The arrangement of the membrane 21 on the clamping device 1, in particular on the base body 3, is shown in an enlarged and exposed manner in FIG. 3 in a detail view. An inventive clamping device is illustrated in FIG. 3 in an unclamped, i.e. for example unpressurized, position.

The base body 3 of the clamping device 1 has a pressure chamber 13. To form the pressure chamber 13, the base body 3 is formed as a ring 3a that is provided with an encircling groove 17 on its end surface 15 oriented in the direction of action, i.e. on the front-side end surface 15. The groove 17 has a shoulder 19, on which the in particular ring-disk-shaped membrane 21 sits. The ring-disk-shaped membrane 21 seals the groove 17 while maintaining the pressure chamber 13. The groove 17 has in this respect an opening 23 towards the front-side end surface 15, i.e. in the direction of action; the opening 23 is sealed in a pressure-tight manner by the membrane 21 while forming of the pressure chamber 13. The membrane 21 is connected with the base body 3 in a pressure-tight manner. The base body 3 and the membrane 21 are preferably manufactured from metallic materials, they are especially preferably manufactured from steel. In the illustrated exemplary embodiment, the membrane 21 is welded with the base body 3 in a pressure-tight manner by using an encircling welding seam 25.

A second membrane 27 is connected with the base body 3 in a pressure-tight manner in the region of a groove base 19, for example welded by an encircling welding seam 35. A pressure fluid 29 is enclosed between the membrane 21 or the first side wall section 31 and the membrane 27 or the second side wall section 37. The pressure fluid 29 can be filled into the pressure chamber 13 via a fill opening 11. The pressure fluid 29 can be held in a sealed manner in the pressure chamber 13 using a stopper 33.

Figure 4:
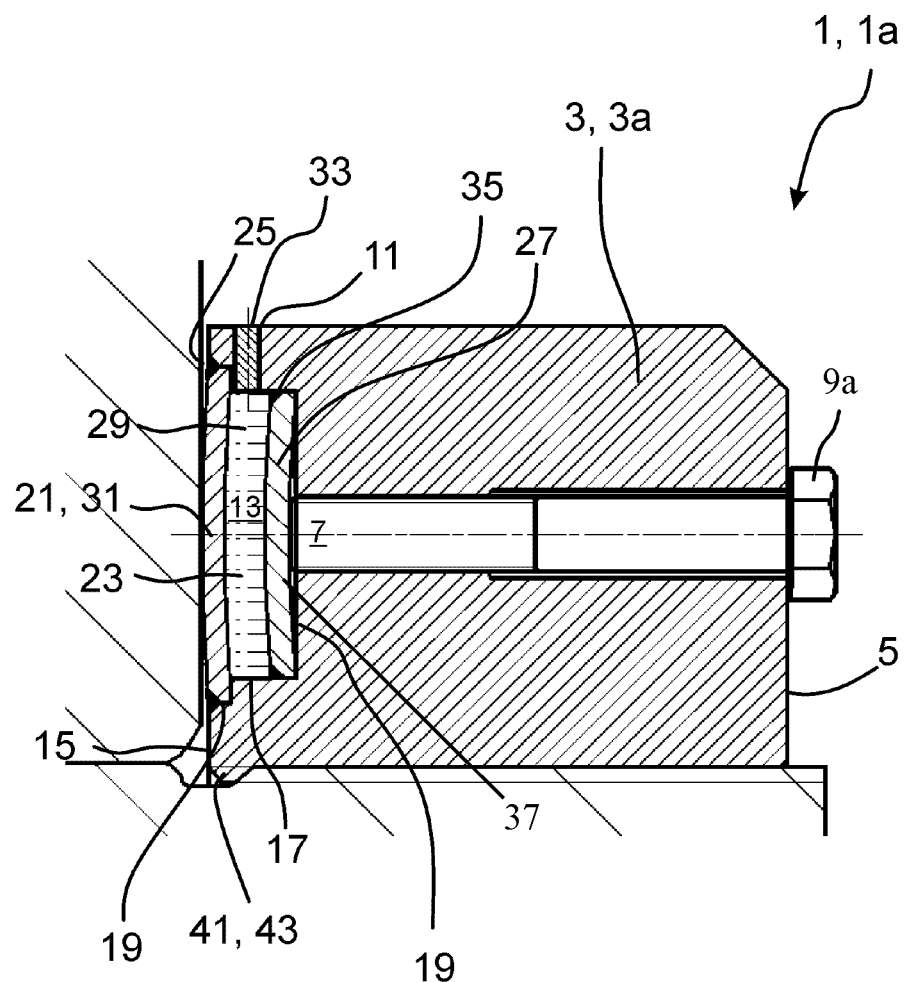
FIG. 4 shows an enlarged partial cross section B from the view according to FIG. 2, in a clamped position.

The inventive clamping device according to FIG. 3 is illustrated in FIG. 4 in a position clamping the rolling-element bearing 45.

Figure 5:
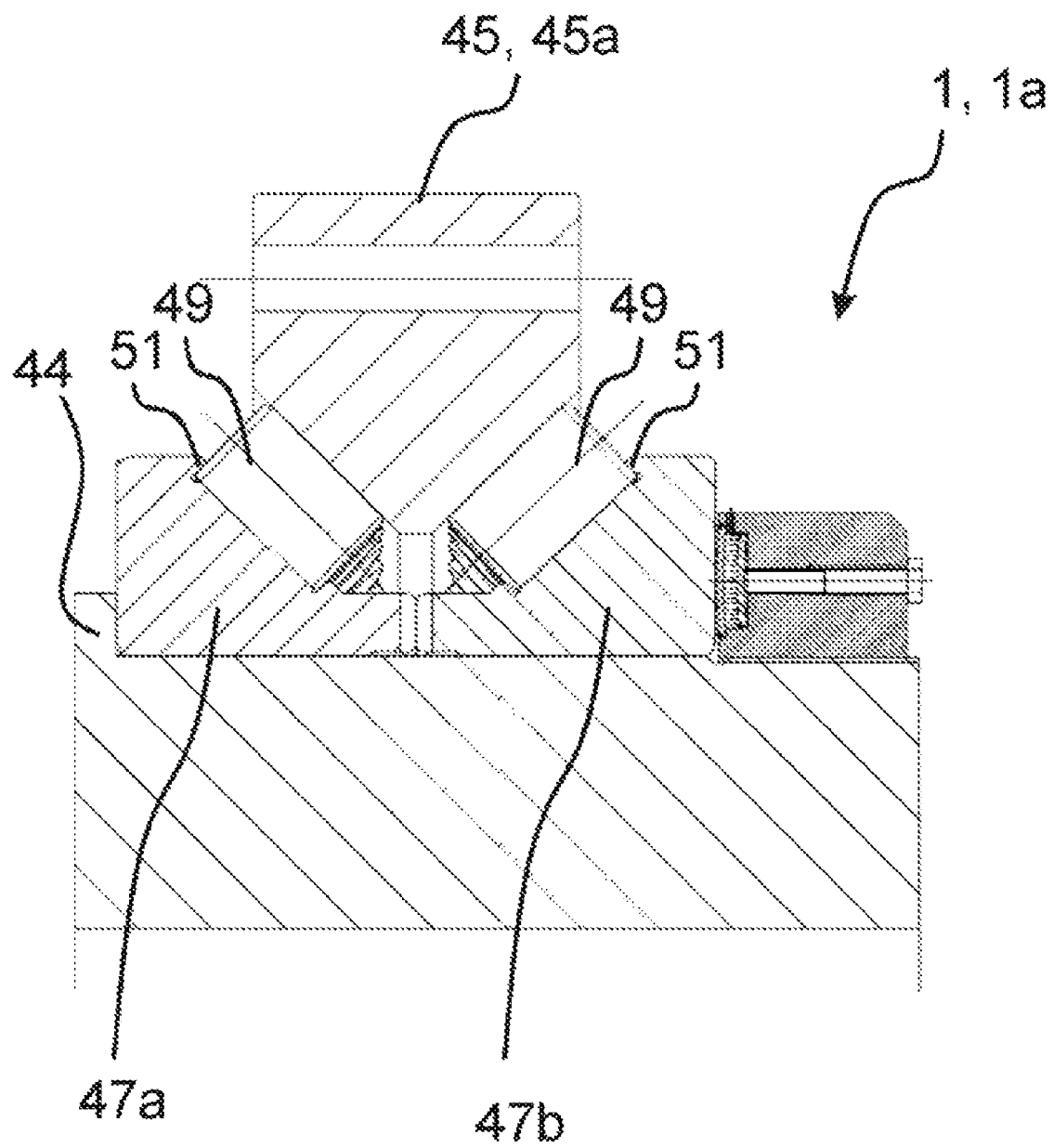
FIG. 5 shows a partial cross section through an assembly group including a bearing seat, a rolling-element bearing, and the inventive clamping device according to FIGS. 1 to 4 in a clamped installation situation.

The mechanical actuator 9 includes the set screw 9a. The depicted set screw 9a represents one of a plurality of mechanical actuators 9, which are shown in FIG. 1. The set screw 9a is axially-adjustably screwed into the ring-shaped base body 3, i.e. into the ring 3a, using a threaded section, which forms the plunger section 7. When the set screw 9a is screwed in, then an end side of the set screw 9a presses in the region of the plunger section 7 against a back side of the second membrane 27 in such a way that the second membrane 27 bulges inward, i.e. towards the pressure chamber 13, i.e. into the fluid 29. The periphery-side of the second membrane 27 is connected with the base body 3, i.e. with the ring 3a, in a pressure-tight manner by the welding seam. In the unclamped state, the second membrane 27, as shown in FIG. 3, lies flat or flush on the groove base 19 of the groove 17. Since a constant amount of pressure fluid 29, which can for example be glycerin, is enclosed in the pressure chamber 13, the first membrane 21 or the first side wall section 31 of the pressure chamber 13 bulges outward and presses the rolling-element bearing 45 or, in the illustrated exemplary embodiment, an inner ring of the rolling-element bearing 45 against a bearing seat 44, as shown in FIG. 5. With regard to the production of an inventive clamping device 1, in particular a bearing clamping device, the groove 17 can first be lathed into the base body 3; subsequently the second membrane 27 can be welded first, and then the first membrane 21 can be welded. Subsequently the pressure fluid 29 is filled into the pressure chamber 13 via the fill opening 11, and the pressure chamber 13 is sealed using the stopper 33. The stopper 33 can for example be welded in, adhered, or pressed in.

In the embodiment shown in FIGS. 3 and 4, the base body 3 is provided with a thread 43 to form a clamping nut 1a. In the depicted exemplary embodiment, the thread 43 is disposed on the inner circumferential side of the base body 3 and thus represents an internal thread 41.

Thus the invention can relate to the securing of a rolling-element bearing using a clamping nut 1a. For this purpose a preferably one-piece base body 3 can have an encircling pressure chamber 13 on its end surface 15, which abuts on a bearing inner ring. In the exemplary embodiment, the pressure chamber 13 is sealed using a welded-on membrane 21. After turning the clamping nut 1a until the membrane 21 fully abuts on the bearing ring of the rolling-element bearing, the pressure in the pressure chamber 13 is increased by tightening the set screw 9a. The first membrane 21 bulges forward and clamps the two inner rings 47a, 47b of the rolling-element bearing 45 against the bearing seat 44. In all such embodiments, the clamping device 1 forms a bearing clamping device.

The relatively thin sidewall of the membrane 21, which is welded onto the base body 3, bulges elastically outward and thus axially loads the rolling-element bearing with the required axial preload.

FIG. 5 shows a partial cross section through an assembly group including a bearing seat 44, a rolling-element bearing 45 and the inventive clamping device 1 or the clamping nut 1a. The clamping nut 1a mutually clamps the two inner rings 47a, 47b of an exemplarily illustrated double row tapered roller bearing 45a in a preloaded position and together against the bearing seat 44.

In the depicted exemplary embodiment, both bearing rows of the double row tapered roller bearing 45a have a contact angle of 45°. This imparts to the rolling element bearing 45a a large supporting width and thus high stiffness. A further advantage of the large contact angle is the small cone angle of the rollers 49 resulting therefrom. The smaller the cone angle, the lower the friction is between the rollers 49 and the guide flange 51. Additionally the guide flange 51 is designed in a tribologically advantageous manner, so that an ideal lubricating film can adapt to the roller-flange contact.

Based on the values which are given for such double row tapered roller bearings 45a, upon the occurrence of a, e.g., maximal axial operating load of $F_{axmax}=7{,}500$ kN, a pressure of approximately 350 bar would be present in the pressure chamber 13. Due to the welding seams 25 in the front-side end surface 15, and since the complete front-side end surface 15 can abut flat on the components to be clamped, such as for example the inner ring 47b according to FIG. 5, a tearing-open of the welding seams can be prevented.

For filling the pressure chamber, for example one of the fill openings 11 illustrated in FIG. 2 can be used for venting, while the pressure fluid can be filled via the other fill opening 11. Further, the pressure chambers 13 can be evacuated using a suitable device prior to the filling with the pressure fluid, so that for example no air can remain in the pressure chambers 13.

REFERENCE NUMBER LIST

1 Clamping device
1a Clamping nut

3 Base body
3a Ring
5 Rearward end side
7 Plunger section
9 Mechanical actuator
9a Set screw
11 Fill opening
13 Pressure chamber
15 Front-side end face
17 Groove
19 Groove base
21 First membrane
23 Opening
25 Welding seam
27 Second membrane
29 Pressure fluid
31 First side wall section
33 Stopper
35 Welding seam
37 Second side wall section
41 Internal thread
43 Thread
44 Bearing seat
45 Rolling-element bearing
45a Double row tapered roller bearing
47a, 47b Inner rings
49 Rollers
51 Guide flange

The invention claimed is:

1. A clamping device comprising:
 a base body defining at least a portion of at least one pressure chamber, the base body having at least one opening oriented in a direction of action, the at least one opening including a step oriented in the direction of action,
 a plate having a first surface exposed at the outside of the base body and a second surface facing into the at least one pressure chamber, the plate having a periphery on the step and being fixedly connected with the base body in a pressure-tight manner and sealing the at least one opening in the direction of action, the membrane defining a first side wall section of the pressure chamber,
 a movable second side wall section partially delimiting the pressure chamber,
 a constant amount of pressure fluid sealed in the pressure chamber, and
 a mechanical actuator configured to move the second side wall section towards the pressure chamber.

2. The clamping device according to claim 1, wherein the mechanical actuator is configured to displace the second side wall section.

3. The clamping device according to claim 2, wherein the mechanical actuator includes a plunger configured to be advanced towards the pressure chamber in order to displace the second side wall section.

4. The clamping device according to claim 3, wherein the second side wall section is disposed opposite of the first side wall section.

5. The clamping device according to claim 4, wherein the second side wall section extends parallel to the first side wall section.

6. The clamping device according to claim 5, wherein the second side wall section is connected with the base body in a pressure-tight manner.

7. The clamping device according to claim 6, wherein:
 the base body is formed as an at least substantially ring-shaped body,
 a groove is defined in one end side of the base body and at least partially encircles the base body,
 the groove at least partially defines the at least one pressure chamber, and
 the membrane is at least partially ring-shaped and seals the groove.

8. The clamping device according to claim 7, wherein the base body includes an external thread disposed on an outer circumferential side of the base body or an internal thread disposed on an inner circumferential side of the base body.

9. The clamping device according to claim 8, wherein the membrane and/or the second side wall section is a composite component containing at least one metallic component.

10. The clamping device according to claim 1, wherein the second side wall section is disposed opposite of the first side wall section.

11. The clamping device according to claim 1, wherein the second side wall section extends parallel to the first side wall section.

12. The clamping device according to claim 1, wherein the second side wall section is an annular plate that is welded to the base body along a base of the annular groove.

13. The clamping device according to claim 1, wherein:
 the base body is formed as an at least substantially ring-shaped body,
 a groove is defined in one end side of the base body and at least partially encircles the base body,
 the groove at least partially defines the at least one pressure chamber, and
 the membrane is at least partially ring-shaped and seals the groove.

14. The clamping device according to claim 1, wherein the base body includes an external thread disposed on an outer circumferential side of the base body and/or an internal thread disposed on an inner circumferential side of the base body.

15. The clamping device according to claim 1, wherein the membrane and/or the second side wall section is a composite component containing at least one metallic component.

16. The clamping device according to claim 1, wherein the plate comprises an annular metal plate.

17. An apparatus comprising:
 a bearing seat,
 a rolling-element bearing, and
 the clamping device of claim 1 pressing the rolling-element bearing against the bearing seat.

18. A clamping device comprising:
 a base body defining at least a portion of at least one pressure chamber, which has at least one opening oriented in a direction of action,
 a membrane connected with the base body in a pressure-tight manner and sealing the at least one opening in the direction of action, the membrane defining a first side wall section of the pressure chamber,
 a movable second side wall section partially delimiting the pressure chamber,
 a constant amount of pressure fluid sealed in the pressure chamber, and
 a device configured to move the second side wall section towards the pressure chamber, wherein:
 the at least one pressure chamber is defined, in part, as an annular groove disposed in an end surface of the base body,
 the membrane is an annular metal plate that at least substantially matches the annular groove, and
 the membrane is welded to the base body.

19. The clamping device according to claim 18, wherein the movable second side wall section is an annular metal plate that is welded to base body along a base of the annular groove.

20. The clamping device according to claim 19, wherein:
the device configured to move the second side wall section comprises a plurality of set screws distributed around a circumference of the base body and threadably engaged in the base body, and
one end of each set screw presses against the second side wall section to deform the second side wall section into the pressure chamber.

21. A clamping device comprising:
a base body defining at least a portion of at least one pressure chamber, the base body having a planar outer wall and at least one opening in the planar outer wall oriented in a direction of action,
a flexible membrane sealing the at least one opening, the flexible membrane being shiftable from a first configuration in which an outer surface of the flexible membrane has a first degree of curvature to a second configuration in which the outer surface of the flexible membrane has a second degree of curvature different than the first degree of curvature,
a side wall section partially delimiting the pressure chamber, the side wall section being shiftable from a first configuration in which a surface of the side wall section has a third degree of curvature to a second configuration in which the surface of the side wall section has a fourth degree of curvature different than the third degree of curvature,
a constant amount of pressure fluid sealed in the pressure chamber, and
at least one mechanical actuator movable in the direction of action and configured to shift the flexible membrane from the first configuration of the flexible membrane to the second configuration of the flexible membrane by shifting the side wall section from the first configuration of the side wall section to the second configuration of the side wall section.

22. The clamping device according to claim 21, wherein the membrane is an annular metal plate welded to the base body and the side wall section is an annular metal plate welded to base body in the at least one pressure chamber.

23. The clamping device according to claim 21, wherein the mechanical actuator is a threaded shaft configured to exert a force against the side wall section.

* * * * *